US012710165B2

(12) United States Patent
Hierzer

(10) Patent No.: US 12,710,165 B2
(45) Date of Patent: Aug. 18, 2026

(54) LIGHTING UNIT FOR A TRACK LIGHTING SYSTEM AND LIGHTING ARRANGEMENT

(71) Applicant: H4x e.U., Graz (AT)

(72) Inventor: Andreas Hierzer, Graz (AT)

(73) Assignee: H4x e.U., Graz (AT)

( * ) Notice: Subject to any disclaimer, the term of this patent is extended or adjusted under 35 U.S.C. 154(b) by 0 days.

(21) Appl. No.: 19/063,688

(22) Filed: Feb. 26, 2025

(65) Prior Publication Data

US 2025/0271127 A1 Aug. 28, 2025

(30) Foreign Application Priority Data

Feb. 27, 2024 (AT) .............................. A 50163/2024

(51) Int. Cl.

| | |
|---|---|
| ***F21V 21/35*** | (2006.01) |
| ***F21S 8/06*** | (2006.01) |
| ***F21V 15/01*** | (2006.01) |
| ***F21V 23/06*** | (2006.01) |
| *F21Y 115/10* | (2016.01) |

(52) U.S. Cl.

CPC .............. *F21V 21/35* (2013.01); *F21S 8/066* (2013.01); *F21V 15/01* (2013.01); *F21V 23/06* (2013.01); *F21Y 2115/10* (2016.08)

(58) Field of Classification Search

CPC .......... F21V 21/35; F21V 15/01; F21V 23/06; F21S 8/066

See application file for complete search history.

(56) References Cited

U.S. PATENT DOCUMENTS 11,435,070 B1 9/2022 Chen
2015/0204522 A1* 7/2015 Baumeister ............... F21S 4/28 29/428

(Continued)

FOREIGN PATENT DOCUMENTS

EP 3388743 A1 10/2018
EP 3723213 A1 10/2020

(Continued)

OTHER PUBLICATIONS

German Office Action for related application No. AT A50163/2024, dated Oct. 29, 2024.

(Continued)

*Primary Examiner* — Christopher E Dunay
(74) *Attorney, Agent, or Firm* — Christopher B. Kilner; MILLEN, WHITE, ZELANO & BRANIGAN, P.C.

(57) ABSTRACT

A track lighting system having a lighting unit includes a mounting track, which is shaped to follow a path curved at least in portions and which track system, along a longitudinal extension of the mounting track, is provided with at least one mounting slot. The lighting unit can be inserted into the mounting slot for electrical contacting of a conductor device of the mounting track. The lighting unit includes a lighting unit body, which is divided into two or more lighting unit segments along a longitudinal extension of the lighting unit body. In each case, the mutually adjacent lighting unit segments are connected to one another in a connecting region. The connecting region allows the lighting unit body to be flexibly bent about at least one bending axis, wherein the bending axis runs non-parallel to the longitudinal extension of the lighting unit body in each case.

25 Claims, 10 Drawing Sheets

(56) References Cited

U.S. PATENT DOCUMENTS

| | | | | |
|---|---|---|---|---|
| 2018/0172257 | A1* | 6/2018 | Hierzer | F21V 5/043 |
| 2020/0355356 | A1* | 11/2020 | Machate | F21V 17/18 |
| 2022/0307662 | A1* | 9/2022 | Hierzer | H01R 25/142 |
| 2024/0084982 | A1* | 3/2024 | Xiong | H01R 24/60 |
| 2025/0122995 | A1 | 4/2025 | Hierzer | |
| 2025/0347395 | A1* | 11/2025 | Fletcher | F21S 4/28 |

FOREIGN PATENT DOCUMENTS

| | | | |
|---|---|---|---|
| EP | 3876365 | A1 | 9/2021 |
| EP | 4542792 | A1 | 4/2025 |
| WO | 2023012507 | A1 | 2/2023 |

OTHER PUBLICATIONS

European Search Report dated Jul. 30, 2025 issued in corresponding application 25159235.8.

* cited by examiner

LIGHTING UNIT FOR A TRACK LIGHTING SYSTEM AND LIGHTING ARRANGEMENT

BACKGROUND OF INVENTION

The invention relates to a lighting unit for a track lighting system with a mounting track which is shaped to follow a path curved at least in portions, and also to a lighting arrangement comprising at least one such lighting unit.

TECHNICAL BACKGROUND

Track lighting systems, which offer more variety and flexibility in the arrangement of lighting fixtures than, for example, permanently mounted individual luminaires, are already known as such.

The EP 3 876 365 A1 describes a light adapter for a track lighting system. The track lighting system comprises a mounting track configured to be curved at least in sections along a longitudinal extension. EP 3 876 365 A1 describes how an adapter body of the light adapter can be bent in order to be able to insert the light adapter practically and easily into the curved mounting track.

SUMMARY OF THE INVENTION

Against this background, it is the object of the present invention to provide a further improved, flexible and compact, and in particular elegant lighting based on a track lighting system, wherein in configuring the lighting arrangement based on the track lighting system there are to be used curved mounting tracks. In particular, there is to be proposed a lighting solution which can be produced in a simple and practical manner.

According to the invention, the object is achieved by a lighting unit having the features of claim 1 and/or by a lighting arrangement having the features of claim 23.

What is proposed is a lighting unit for a track lighting system comprising a mounting track which is shaped to follow a path curved at least in portions. The mounting track is provided with at least one mounting slot along the longitudinal extension thereof.

The lighting unit can be inserted into the mounting slot for electrical contacting of a conductor device on the mounting track. The lighting unit comprises a lighting unit body that is divided into two or more lighting unit segments along a longitudinal extension of the lighting unit body. In each case, adjacent lighting unit segments are connected to each another in a connecting region, wherein the connecting region enables the lighting unit body to be flexibly bent about at least one bending axis. The bending axis does not run parallel to the longitudinal extension of the lighting unit body. The lighting unit body is configured to be more flexible in the connecting region than in the region of the lighting unit segments.

Furthermore, according to the invention, a lighting arrangement is created with:

- a mounting track shaped to follow an at least in portions curved path, provided with at least one mounting slot along a longitudinal extension of the mounting track and comprising a conductor device; and
- at least one lighting unit according to the invention, which is inserted in the mounting slot and is in electrical contact with the conductor device.

The lighting unit can be supplied with at least the electric power provided by the conductor device for operating the lighting unit, or at least with the electric power and a control signal provided by the conductor device.

One of the ideas underlying the invention is to provide the lighting unit with bendability in at least one direction, wherein the lighting unit can be used in a flexible manner in mounting tracks with a curved shape. A versatile, compact and elegant lighting solution is achieved by having the lighting unit inserted into the mounting slot, and by combining this with the mounting track being able to be curved in a variety of manners in that region in which the lighting unit is inserted.

By specifically equipping the lighting unit body with better bendability and flexibility in the connecting regions, the lighting unit segments as such can be configured to be more rigid and stiffer, thus enabling further components accommodated in the lighting unit segments, for example light generating apparatus and/or electrical and/or electronic components for the operation of the light generating apparatus, to be well protected and precisely retained. In addition, this configuration can contribute to simplifying the manufacturing of the lighting unit.

Advantageous embodiments and further developments of the invention are apparent from further sub-claims and from the description with reference to the figures.

In one embodiment, the at least one bending axis runs substantially perpendicular to the longitudinal extension of the lighting unit body. The lighting unit can therefore be used in a variety of ways together with curved mounting tracks.

According to one embodiment, the connecting region allows the lighting unit body to be flexibly bent about at least two bending axes. The two bending axes are non-parallel to each other and run non-parallel to the longitudinal extension of the lighting unit body. With this embodiment, the lighting unit can be used even more flexibly in mounting tracks of various curved shapes. In particular, this embodiment makes it possible to insert the lighting unit into a mounting slot, which can be arranged on the curved mounting track in a wide variety of manners, wherein restrictions with regard to the possible orientation of a depth direction of the mounting slot and an inserting direction of the lighting unit in the cross-section of the mounting track are avoided.

In one embodiment, the two bending axes are substantially perpendicular to each other and/or run substantially perpendicular to the longitudinal extension of the lighting unit body. This enables even more versatile applicability of the lighting unit with curved mounting tracks.

For example, the lighting unit body may comprise three to ten lighting unit segments, for example three or six lighting unit segments. In further embodiments there are conceivable further numbers of lighting unit segments, for example four, five, seven or eight lighting unit segments. In this way, the flexible adaptability of the lighting unit to the course of the mounting track and/or the possibility of accommodating further components in the lighting unit body can be varied and improved.

In one embodiment, the connecting region(s) is/are each configured with at least one corrugation structure with corrugation peaks and corrugation troughs. In a further development, the directions of the crests of the corrugation peaks and the bottoms of the corrugation troughs run non-parallel, in particular substantially perpendicular, to the longitudinal extension of the lighting unit body. Bendability in the connecting regions is thus achieved in a way that is uncomplicated and cost-effective to manufacture.

In one embodiment, the connecting region(s) is/are each configured with at least one elastic intermediate portion. In particular, the elastic intermediate portion can be configured in the form of a plate or wall. This embodiment also enables bendability in the connecting regions in a practical and cost-effective manner.

In one embodiment, the lighting unit body comprises a box-like shape, wherein the lighting unit segments are each configured with at least a lid portion, side walls and an interior. In this manner, the lighting unit segments enable the accommodation of further components, for example electrical and/or electronic components. In particular, such housed components may comprise one or more light generating apparatus(es), devices for electrical contacting, and/or devices for supplying and/or controlling the light generating apparatus(es).

In particular, at least one of the lighting unit segments comprises at least one light generating apparatus. In further embodiments, several or all of the lighting unit segments can each be equipped with at least one light generating apparatus.

The lighting unit body can, for example, be configured as a housing component of the lighting unit, for example as an integrally formed housing component.

In particular, the lid portion and the side walls of the lighting unit segment can each be integrally configured with one another. This can simplify production.

In one embodiment, mutually adjacent edge regions of the side walls of the mutually adjacent lighting unit segments are connected in the connecting region by a corrugation structure with corrugation peaks and corrugation troughs in each case. In particular, the corrugation structure can be configured in one piece with the side walls connected by it. This further simplifies the manufacturing process.

In a further embodiment, mutually adjacent edge regions of the side walls of the mutually adjacent lighting unit segments are each connected in the connecting region by an elastic intermediate portion, in particular a plate-like or wall-like elastic intermediate portion. The intermediate portion can, for example, be configured integrally with the side walls connected thereto.

In a further development, crests of the corrugation peaks and bottoms of the corrugation troughs run substantially parallel to the side walls connected by the corrugation structure. Thus, good bendability around a bending axis parallel to the side walls is achieved. In particular, the directions of the crests and bottoms run transversely, for example approximately perpendicular, to the longitudinal extension of the lighting unit body.

In one embodiment, the plate-like or wall-like elastic intermediate portion is configured as a substantially planar continuation of a main extension surface of one of the side walls in the direction of an adjacent one of the side walls. Thus, good bendability can be achieved with a simple shape.

In particular, in one embodiment, the corrugation structure may comprise at least two wavelengths, for example substantially two full wavelengths. This contributes to good bendability both about a bending axis that, for example, is substantially parallel to the crests and bottoms, and also about another bending axis that runs transversely to the crests and bottoms, for example, is substantially perpendicular.

In one embodiment, at least one flat carrier component is accommodated in the interiors of at least two adjacent lighting unit segments. The flat carrier component carries electrical conductors and, in particular, electronic components and/or electrical contacting devices. In particular, the flat carrier components can each carry one or more light generating apparatus, in particular LEDs, or at least one of the flat carrier components can carry one or more light generating apparatus, in particular LEDs. Furthermore, in this embodiment, the flat carrier components of the adjacent lighting unit segments are connected to each other and electrically coupled via a tape-like or film-like, flexible connector. In this way, an arrangement of electrical and/or electronic components housed in the lighting unit body can follow the bending of the lighting unit body without any problems or damage. The tape or foil-like connection is easy and inexpensive to produce.

In a further development provision is made that one, several or all of the flat carrier components each carry one or more light generating apparatus, in particular an LED or LEDs. Therefore, the light generating apparatus can be arranged in a space-saving manner and supplied in a practical way.

In a further embodiment, the flat carrier component is accommodated in the interior in each case substantially parallel to the lid portion between the side walls. This can, for example, facilitate the arrangement of contact elements in such a way that the contact elements can contact the conductor device of the mounting track through recesses in both opposite side walls, as well as simplifying the assembly of the carrier component. For example, a single-sided carrier component can be used, such as a single-sided printed circuit board.

In one embodiment in the interior there is also accommodated at least one optical element, for example a reflector or a lens. For example, it may be provided that the optical element is arranged on a side of the flat carrier component facing the lid portion and enables light generated by one or more of the light generating apparatus during operation to be directed outwards through an opening in the lid portion for emission by the lighting unit.

In one embodiment, the tape-like or film-like flexible connection in the connecting region is formed with a tape-like or film-like flexible material which carries conductive traces and is arranged bent in a U-shape in the connecting region. In particular, it may be provided that a bottom of the U-shape runs substantially parallel to the lid portions in an unbent state of the lighting unit. Due to the flexibility and ribbon- or foil-like nature of the material as well as the U-shape, this embodiment allows the adjacent carrier components to move relative to each other in the connecting region about more than one axis. Furthermore, the bottom of the U-shape can run transversely in particular to the longitudinal extension of the lighting unit body.

In one further development in particular, the U-shape is arranged in a transverse direction of the lighting unit between two of the corrugation structures of the connecting region. The material arranged in the form of a U thus provides flexibility in the connecting region, in which the corrugation structure allows the lighting unit body to be flexible and bendable.

In another further development, the U-shape is arranged in a transverse direction of the lighting unit between two of the elastic intermediate portions of the connecting region. In this way, the material arranged in the shape of a U provides flexibility in the connecting region, in which the elastic, for example wall- or plate-like, intermediate portion allows the lighting unit body to be flexible and bendable.

In one embodiment, the lighting unit segments are each substantially closed on a side opposite the lid portion by means of a bottom element, wherein the bottom element is in particular configured as a separate component. Components inside the lighting unit body, in particular electrical and/or electronic components, optical elements or light generating apparatus, can thus be housed even better protected.

The bottom element can be configured as a common component for the lighting unit segments, which is configured with bottom portions, wherein the bottom portions are each flexibly connected to one another and are each assigned to one of the lighting unit segments. In an alternative embodiment, each of the lighting unit segments can be assigned a separate bottom element that is configured separately from the other bottom elements.

For example, the bottom element can be latched to the side walls of the lighting unit segment.

In one embodiment, a gap is provided between facing narrow side edges of the lid portions of the adjacent lighting unit segments in an unbent state of the lighting unit body. In this case, the narrow side edge of a first of the lid portions is formed with a convex contour as seen in a main extension plane of the first lid portion and the narrow side edge of a second of the lid portions is formed with a concave contour as seen in a main extension plane of the second lid portion. In this embodiment, the convex and concave contours mesh with each other in such a way that the gap remains in the unbent state. This prevents the lid portions from colliding during bending or hindering the bending process. At the same time, it can be achieved that successive lid portions form a largely closed surface. In their interaction, the concave and convex contours facilitate, in particular, bending about a bending axis transversely to the main extension planes of the lid portions.

In a further embodiment, the narrow side edge of the second lid portion can be provided with a chamfer within the concave contour. This can additionally contribute to further facilitating bending about a bending axis substantially parallel to the main extension planes of the lid portions.

In a further development, the lighting unit body is made with at least one plastic material. The use of at least one plastic material contributes to the cost-effective manufacturing of a weight-saving component. In addition, a plastic material can provide electrically insulating properties as required.

In one embodiment, the mutually adjacent lighting unit segments are integrally connected in the connecting region. The number of individual components to be mounted can thus be avoided, which further simplifies manufacturing.

In one embodiment, the lighting unit body is configured with the same material, in particular the same plastic material, in the lighting unit segments and in the connecting regions. This can further contribute to simplifying manufacturing and reducing manufacturing costs.

In one embodiment, the lighting unit body is configured in the lighting unit segments with a first material, in particular a first plastic material, and in the connecting regions with a second material, in particular a second plastic material, which is different from the first material. For example, the second material may comprise a higher elasticity than the first material. This means that the choice of material can be easily adjusted to the respective function of the lighting unit segment and connecting region. The second material can, for example, be configured as a rubber-like plastic in the solidified state, whereas the first material can be relatively rigid in the solidified state, for example. In particular, the corrugation structure(s) or the elastic intermediate portion(s) may be formed from the second material.

In an exemplary embodiment, the lighting unit body is manufactured in an injection molding process. In an alternative embodiment, the lighting unit body can be manufactured by means of 3D printing. Furthermore, in further embodiments, the bottom element or the bottom elements can also be formed from the one plastic material or the first plastic material. For example, the bottom element or bottom elements can be injection-molded or 3D printed. The use of an injection molding process enables cost-effective manufacturing, in particular in larger quantities, whereas a 3D printing process is well suited for components with complex geometries and avoids the need for an expensive casting tool, which can be an advantage for smaller quantities.

In particular, the first material and the second material can be processed jointly in the injection molding process or the 3D printing process during the manufacturing of the lighting unit body. Thus, injection molding or 3D printing of the areas formed with the first and second material can be carried out in one step, which is advantageous for efficient and cost-effective manufacturing.

In one embodiment, the path followed by the mounting track may be a planar curve, wherein a depth direction of the mounting slot is substantially normal to a plane of the curve. In this manner, for example, light emission directed substantially towards a surface, such as the ground of a room, can be implemented comparatively easily by the lighting unit, in particular using relatively simply configured optical devices.

In one embodiment, the path followed by the mounting track can be a flat curve, wherein at least in one portion of the mounting track a depth direction of the mounting slot deviates from a normal to the plane of the curve, for example lies in the plane or runs at an angle to it. The lighting unit curved in such a manner can advantageously be used to achieve interesting lighting effects, particularly if it can be bent about two bending axes.

In another embodiment, the path followed by the mounting track can be a three-dimensional curve, wherein at least in one portion of the mounting track a depth direction of the mounting slot deviates from a binormal of an accompanying tripod of the three-dimensional curve, for example runs along a main normal or lies in the normal plane spanned by the binormal and the main normal. Yet in a further and equally useful embodiment, the depth direction of the mounting slot can run along or parallel to the binormal. Therefore, again diverse and aesthetic lighting solutions are possible.

In one embodiment, the mounting track comprises at least two mounting slots, and the lighting arrangement comprises at least two of the lighting units according to the invention, wherein the lighting units within a portion of the mounting track, within which the path is curved, are each inserted opposite one another at least in portions into one of the mounting slots. Thus, the same type of lighting unit can be used in several mounting slots of the curved mounting track in the curved portion in a flexible and versatile way.

The above embodiments and further developments can, where appropriate, be combined with each other in any form. Further possible embodiments, developments and implementations of the invention also comprise non-explicitly specified combinations of features of the invention which have been described above or below with respect to the exemplary embodiments. In particular, the person skilled in the art will also add individual aspects as improvements or additions to the respective basic form of the present invention.

BRIEF DESCRIPTION OF THE DRAWINGS

The invention will be explained in more detail below on the basis of the exemplary embodiments specified in the schematic figures. In the drawings.

Figure 1:
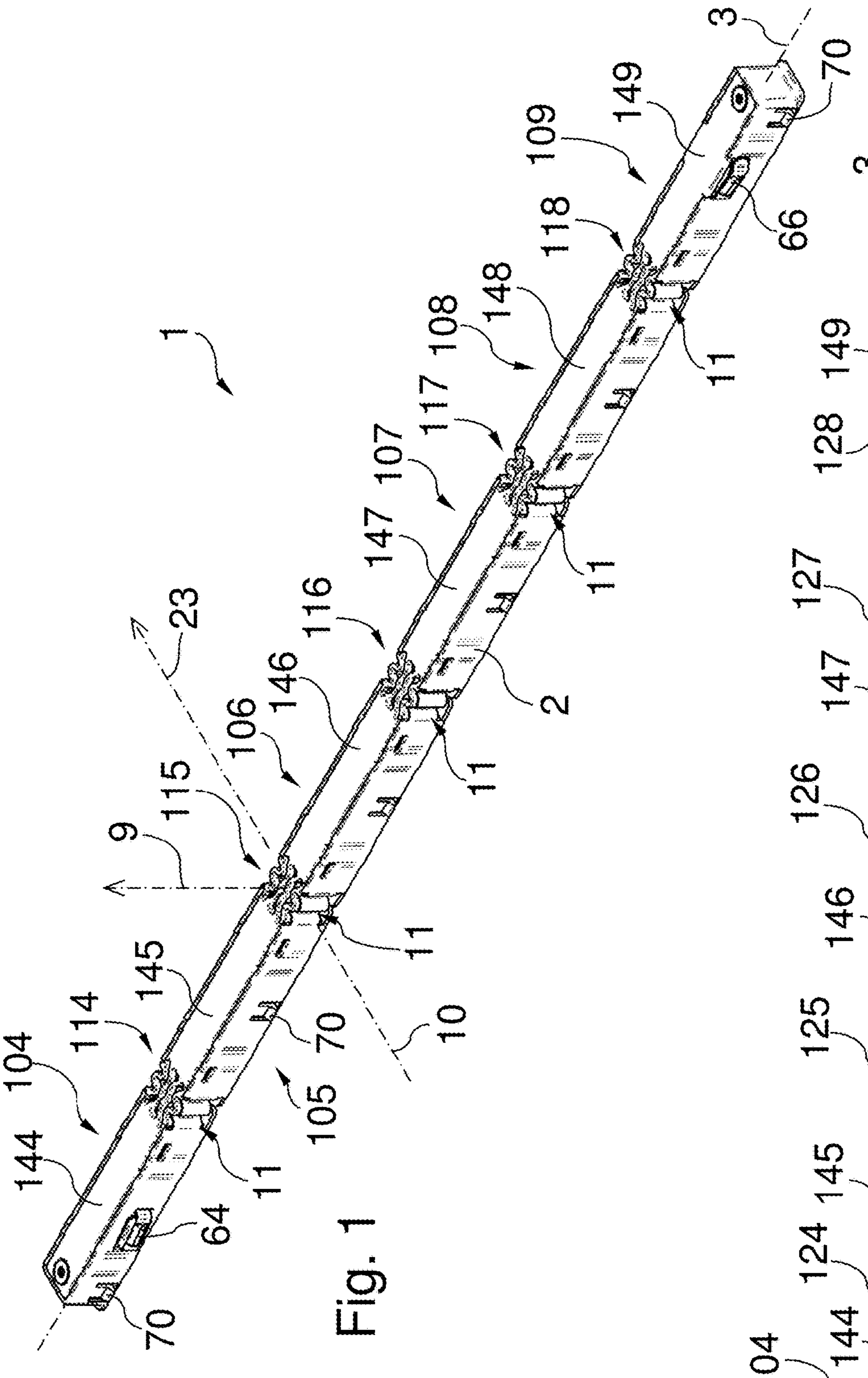
FIG. 1 a perspective view of a lighting unit according to a first exemplary embodiment.
Figure 2:
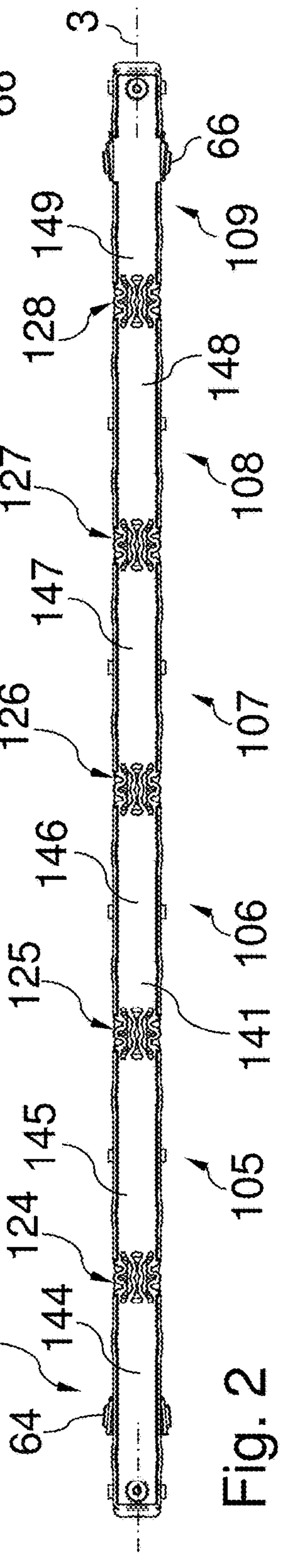
FIG. 2 a bottom view of the lighting unit of FIG. 1.

The enclosed figures are intended to provide a better understanding of the embodiments of the present invention. They illustrate embodiments and, together with the description, serve to explain principles and concepts of the invention. Other embodiments and many of the cited advantages emerge in light of the drawings. The elements of the drawings are not necessarily shown to scale in relation to one another.

In the figures, identical, functionally identical and identically acting elements, features and components are each provided with the same reference symbols unless stated otherwise.

DESCRIPTION OF EXEMPLARY EMBODIMENTS

FIGS. 1 to 12 illustrate a lighting unit 1 for a track lighting system and a lighting arrangement 2000 with the lighting unit 1. The lighting unit 1 comprises a lighting unit body 2, which is divided into lighting unit segments 104, 105, 106, 107, 108 and 109 along a longitudinal extension 3 of the lighting unit body 2.

The lighting unit segments 104 to 105 that are mutually adjacent to each other are each connected in a connecting region 114 to 118 in each case. For example, the two lighting unit segments 104 and 105 are connected to each other in the connecting region 114, and the lighting unit segments 105 and 106 are connected to each other in a further connecting region 115. The same applies to the other lighting unit segments 106-109. The connecting regions 114 to 118 are formed in the same manner and each allow the lighting unit body 2 to be flexibly bent about at least one bending axis. In the first exemplary embodiment, the connecting regions 114 to 118 each allow the lighting unit body 2 to be flexibly bent about at least a first bending axis 9 and a second bending axis 10, wherein the first and second bending axes 9, 10 each run substantially at a right angle, and thus normal, to the longitudinal extension 3. The bending axes 9 and 10 are also substantially perpendicular to each other. In particular, the second bending axis 10 extends along a transverse direction 23 of the lighting unit 1. It is understood that, in particular, two or more bending axes are possible, which are at different angles to each other and are not parallel to the longitudinal extension 3. The bending axes 9, 10 run analogously through the connecting regions 114, 115, 116, 117 and 118, but, for the sake of clarity, are only shown for the connecting region 115 in FIG. 1.

In the first embodiment example shown in the drawings in FIGS. 1 to 12 and its variants, the lighting unit body 2 is configured with an integrally manufactured component made of a plastic material and, for example, injection-molded or 3D-printed, forms a component of a housing of the lighting unit 1 and comprises an elongated box-like shape.

In the lighting unit segments 104, 105, 106, 107, 108 and 109, the lighting unit body 2 is formed in each case with a plate-shaped lid portion **94*a*, 95*a*, 96*a*, 97*a*, 98*a*, 99*a* with substantially flat side walls 94*b*, 95*b*, 96*b*, 97*b*, 98*b*, 99*b* and end-face walls, not designated in more detail, wherein the side walls 94*b* to 99*b*, the lid portions 94*a* to 99*a* and the end-face walls, not designated in more detail, limit an interior 14*c*, 15*c* or 16*c* of the lighting unit segment 104 to 109 in each case. The lid portions 94*a* to 99*a*, side walls 94*b* to 99*b* and end-face walls are preferably integrally formed with each other in the lighting unit segment 104 to 109**.

In each of the connecting regions 114 to 118, the mutually adjacent edge regions of the side walls **94*b* and 95*b*, 95*b* and 96*b*, 96*b* and 97*b*, 97*b* and 98*b*, 98*b* and 99*b* of the mutually adjacent ones of the lighting unit segments 104 to 109 are connected by a corrugation structure 11 having corrugation peaks 12 and corrugation troughs 13, wherein the corrugation structure 11 is integrally made with the side walls 94*b*, 95*b* or 95*b*, 96*b* or 96*b*, 97*b* or 97*b*, 98*b* or 98*b*, 99*b* connected therethrough. In the lighting unit body 2, the lid portions 94*a* to 99*a*, the side walls 94*b* to 99*b* together with the end-face walls and the corrugation structures 11** can be formed with the same plastic material.

Figure 5:
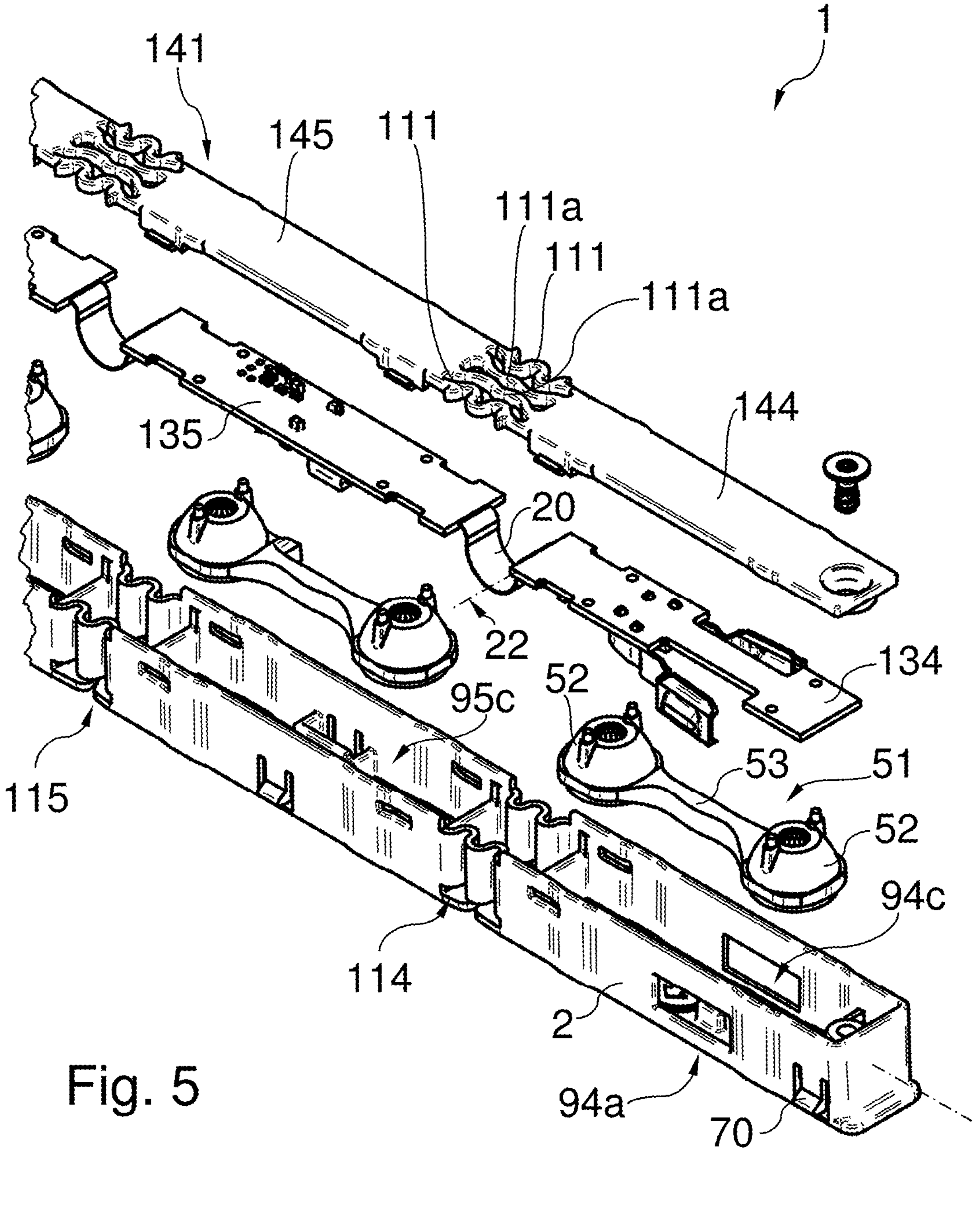
FIG. 5 a perspective detail view from FIG. 4.
Figure 6:
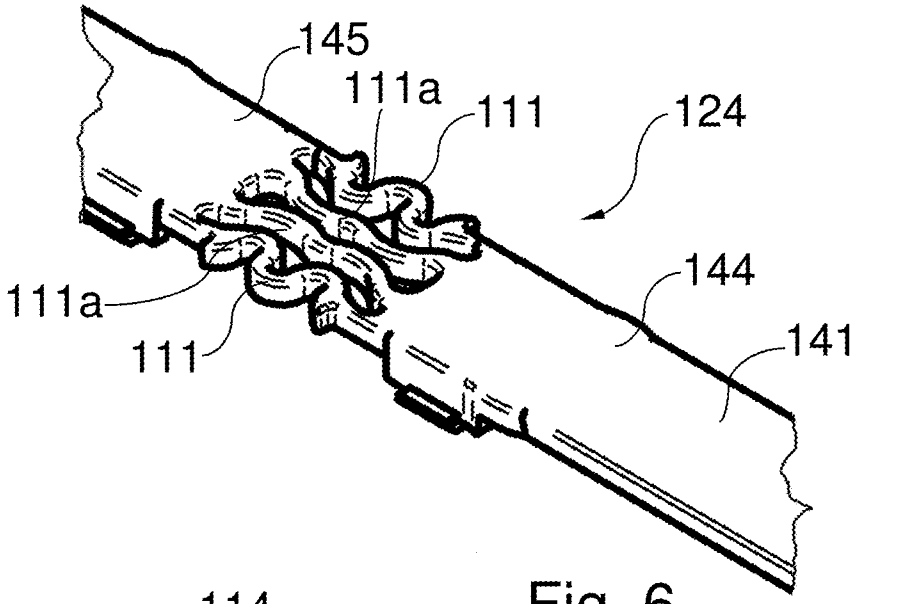
FIG. 6 a perspective detail view of a bottom element for the lighting unit of the first exemplary embodiment in a connecting region that flexibly connects two bottom sections.
Figure 7:
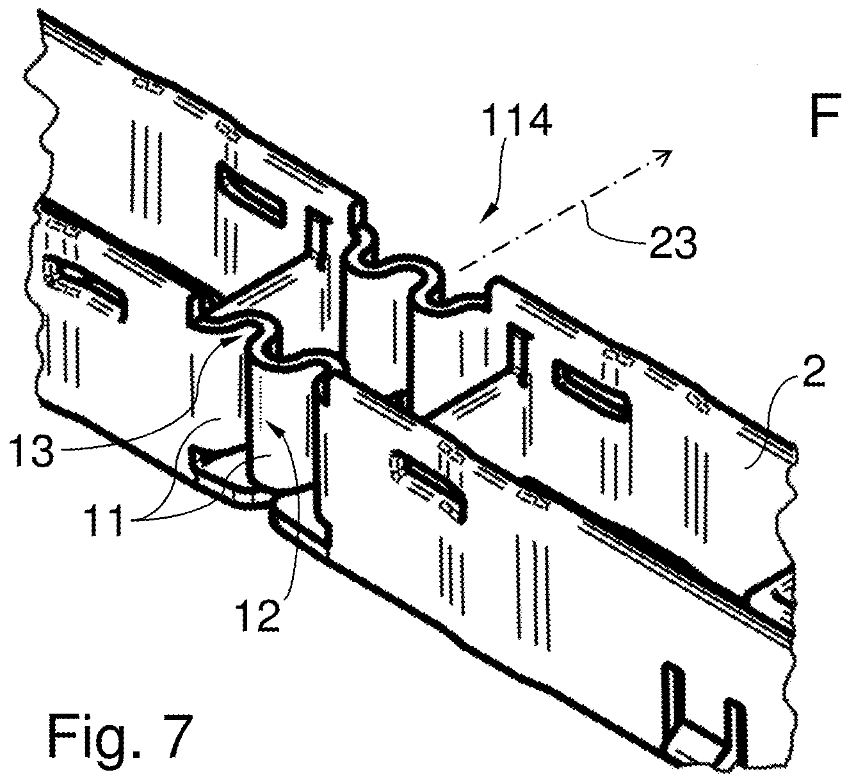
FIG. 7 a perspective detail view of a lighting unit body of the lighting unit according to the first exemplary embodiment.
Figure 8:
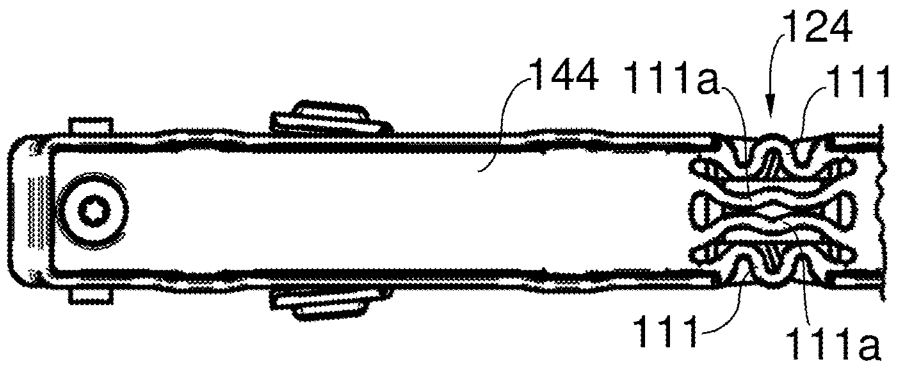
FIG. 8 a detail of the plan view from FIG. 2.
Figure 10:
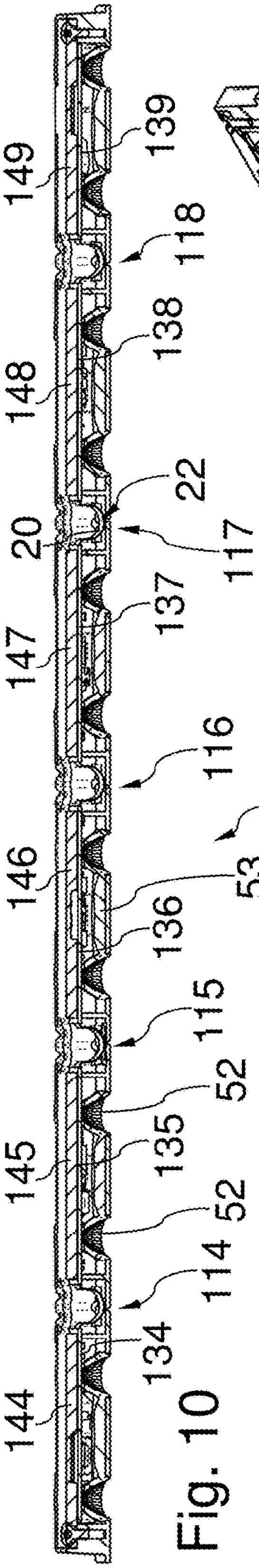
FIGS. 9, 10 two views of the lighting unit of FIG. 1, cut along a longitudinal center plane thereof.
Figure 9:
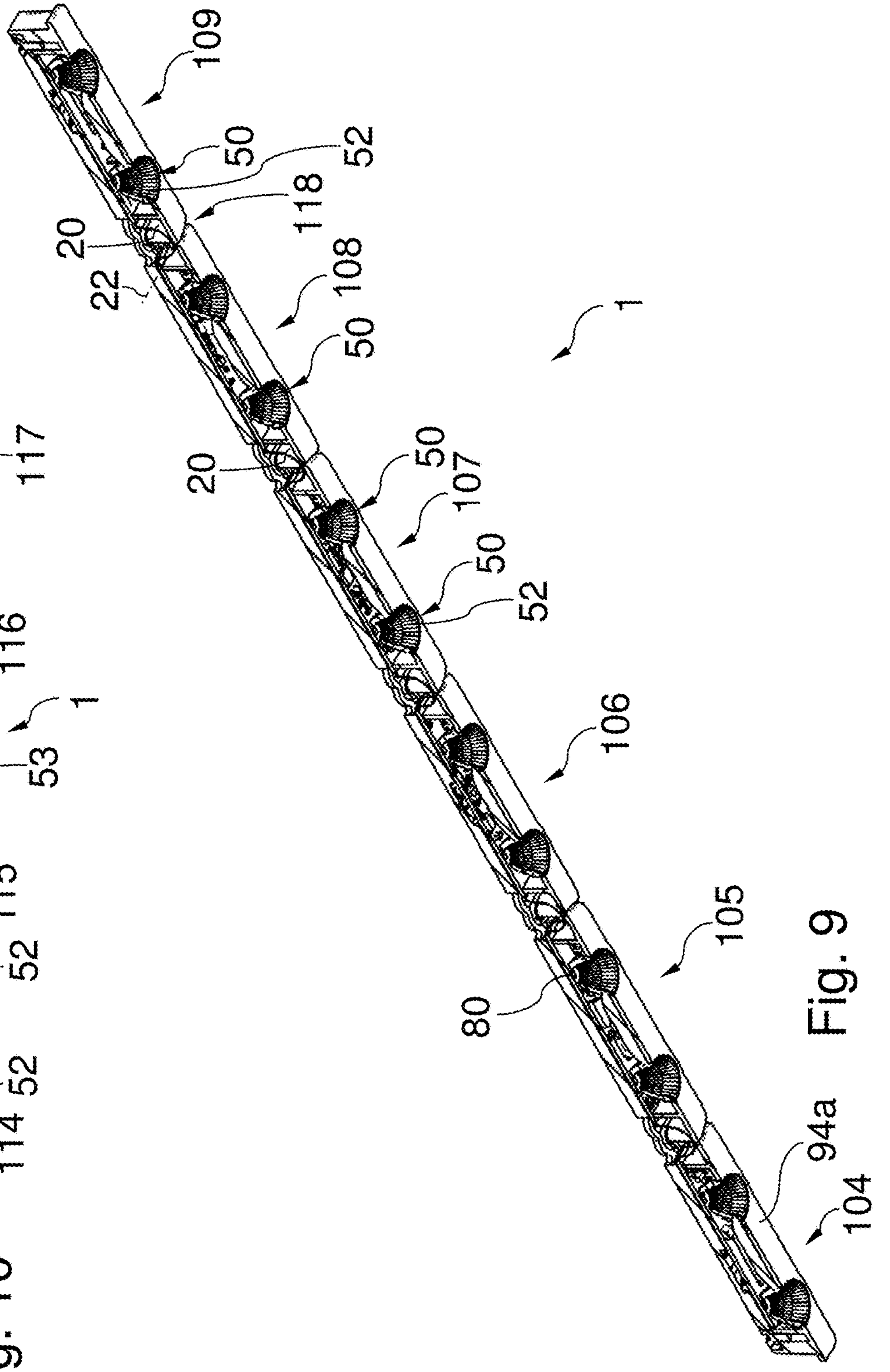

The corrugation structure 11 is also clearly recognizable, in particular, also in FIGS. 5 and 7, and in each case comprises substantially two full wavelengths as an example, in order to enable a high degree of flexibility and bendability in the connecting regions 114 to 118. In variants, however, the number of corrugation peaks and troughs 12, 13 can be modified in comparing with the design shown in the figures.

Directions of crests of the corrugation peaks 12 and of bottoms of the corrugation troughs 13 each extend transversely, in particular approximately perpendicularly, to the longitudinal extension 3 of the lighting unit body 2, and thus each run substantially parallel to the side walls 94*b* to 99*b* connected by the corrugation structure 11. In some variants, one or more of the crests and/or bottoms can deviate in their orientation by a few degrees from a normal to the longitudinal extension 3, for example by up to 5 degrees.

The corrugation structures 11 enable the lighting unit body 2 to be bent about two axes in the connecting regions 114 to 118, in particular about both the first bending axis 9 and the second bending axis 10. In the figures, the directions of the crests of the corrugation peaks 12 and the bottoms of the corrugation troughs 13 run substantially parallel to the first bending axis 9 and substantially normal to the second bending axis 10.

With the aid of the corrugation structures 11, the lighting unit body 2 is configured to be more flexible in the connecting region 114 to 118 than in the region of the lighting unit segments 104 to 109. In the way, good bendability of the lighting unit 1 can be achieved while at the same time components housed within the interiors 94*c* to 99*c* of the relatively rigid and stiff lighting unit segments 104 to 109 outside the connecting regions 114 to 118 are well protected. Components housed in this way are explained in more detail below.

A flat carrier component 134 to 139 is accommodated in each of the interiors 94*c* to 99*c* and can be held there reliably and precisely due to the relatively rigid design of the lighting unit segments 104 to 109, comparing with the connecting regions 114 to 118. The carrier components 134, 135, 136, 137, 138, 139 are preferably configured as printed circuit boards and each carry electrical conductors. Furthermore, in the first exemplary embodiment, light generating apparatus 80 configured with LEDs are provided on each of the carrier components 134 to 139 in the region of the lower sides thereof, for example in FIG. 4, see for example FIG. 3.

Figure 4:
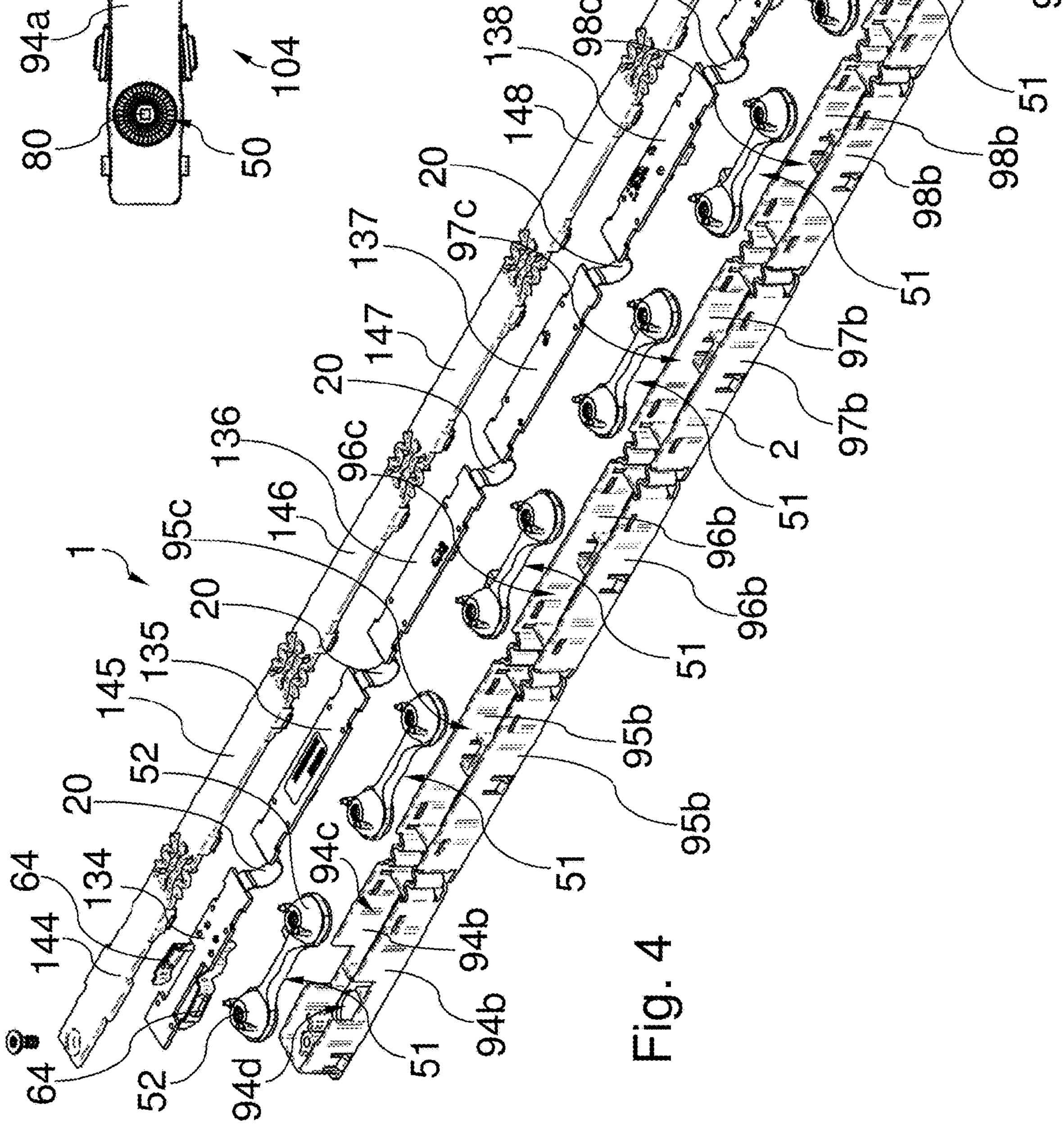
FIG. 4 an exploded perspective view of the lighting unit of FIG. 1.

In particular, in the first exemplary embodiment, each carrier component 134 to 139 carries two LEDs or two groups of LEDs as light generating apparatus 80. To the light generating apparatuses 80, for example to the two LEDs or the two groups of LEDs, in each case there is assigned an optical element 52 in such a manner that light emitted by the light generating apparatuses 80 can be directed through the optical element 52 for emitting the light in a desired manner. In the first exemplary embodiment, each lighting unit segment 104-109 comprises a dumbbell-shaped optical assembly 51 in which two optical elements 52 are connected to each other by a web 53. The optical assembly 51 is arranged in the interior 94*c*, 95*c*, 960, 97*c*, 98*c* or 99*c* between the carrier component 134, 135, 136, 137, 138 or 139 and the lid portion 94*a*, 95*a*, 96*a*, 97*a*, 98*a* or 99*a* in each case. Here, the optical elements 52 are each arranged at a position corresponding to the position of an exemplary round opening in the lid portion 94*a* to 99*a*. In FIG. 4, for example, such an opening 94*d* is only visible for one optical element 52 of the lighting unit segment 104, however, it is present analogously for the second optical element 52 and for the other segments 105 to 109. For example, in the first exemplary embodiment shown in the figures, the optical elements 52 are configured as reflectors, wherein instead a configuration of the optical elements 52, for example as lenses, is also conceivable. Further, it is conceivable to provide a diffuse light emission by the lighting unit 1 instead of a directed or bundled light emission. In the regions in which provision is made for the openings analogous to the opening 94*d* and the optical elements 52, each of the lighting unit segments 104 to 109 thus comprises two light emitting regions 50 in the first exemplary embodiment.

Electronic components are also provided on one, more or all of the support components 134 to 139 for supplying electrical power to and/or controlling the light generating apparatus 80. One or more control signal(s) can be accommodated by the lighting unit 1 to control the lighting unit 1 and, in particular, the light generating apparatus 80.

In the first exemplary embodiment, the carrier component 134 exemplarily carries two resilient contact elements 64 and the carrier component 139 carries two resilient contact elements 66. The contact elements 64 each protrude through an associated recess in one of the opposing side walls 94*b*, while the contact elements 66 each protrude through an associated recess in one of the opposing side walls 99*b*. The carrier components 134 to 139 can, for example, be fitted on one side, in FIGS. 1, 4, 5, 9, 10 on the underside.

The carrier components 134 and 135, 135 and 136, 136 and 137, 137 and 138, and 138 and 139 are each electrically coupled and connected in the connecting region 114 to 118 by a flexible connection 20 configured in a band-like or film-like manner. The connection 20 is formed in each case with a tape-like or film-like flexible material, for example an insulating plastic tape or an insulating plastic film, wherein this material carries conductive traces and is arranged bent in a U-shape in each case in the connecting region 114 to 118, see in particular FIGS. 4, 5, 9, 10.

The substantially planar, plate-like support components 134 to 139 are each accommodated in the interior 94*c* to 99*c* substantially parallel to the lid portion 94*a* to 99*a* between the opposing side walls 94*b*, 94*b* or 95*b*, 95*b* or 96*b*, 96*b* or 97*b*, 97*b* or 98*b*, 98*b* or 99*b*, 99*b*. A bottom 22 of the U-shape of the connector 20 runs substantially parallel to the lid portions 94*a* to 99*a* and substantially transversely to the longitudinal extension 3 in the unbent state of the lighting unit 1.

The arrangement of electrical and/or electronic components as well as the light generating apparatus 80 housed in the lighting unit body 2 by means of the support components 134 to 139, as well as the arrangement of the optical elements 52, thus follows a bending of the lighting unit body 2 in a damage-free and reliable manner. The tape- or film-like connector 20 can be manufactured relatively easily and inexpensively. The tape-like or film-like material of the connectors 20 may be connected to the support components 134 to 139 at their facing edges, or may continue into the support components 134 to 139. The plate-like carrier components 134 to 139 and the connectors 20 may be configured together as a so-called rigid-flex PCB, wherein PCB stands for printed circuit board.

FIGS. 4, 5, 9 and 10 further show that the band-like or film-like, flexible connectors 20 are arranged in each case, in the transverse direction 23 of the lighting unit 1, between two of the corrugation structures 11. The flexible connections 20 thus enable bending in interaction with the corrugation structures 11, in particular about the bending axes 9, 10.

In the area of each of the lighting unit segments 104 to 109, the lighting unit body 2 is closed on a side opposite the lid portion 94*a* to 99*a* by a bottom element 141 provided in common for the segments 104 to 109, see in particular FIGS. 1, 2, 4, 5, 10. The bottom element 141 is configured with substantially plate-like bottom sections 144 to 149, one of which is assigned to each of the lighting unit segments 104 to 109 and closes it off on the underside.

The bottom element 141 is configured as an integrally separate component, for example manufactured from a plastic material, in particular injection-molded or 3D-printed. The bottom portions 144 to 149 are each interlocked with the side walls 94*b* to 99*b* of the lighting unit segment 104 to 109 to which the bottom element 44, 45, 46 is respectively assigned. Furthermore, in the first exemplary embodiment, the base section 144 and 149 is additionally connected to the lighting unit body 2 at both end-face ends of the lighting unit 1 by means of a screw.

In each case, adjacent ones of the bottom portions 144 to 149 are bendably connected to each other within the bottom element 141 in a connecting region 124 to 128. The connecting regions 124 to 128 are arranged at positions along the longitudinal extension 3 corresponding to the positions of the connecting regions 114 to 118. The connecting regions 124 to 128 are configured such that they allow the bendability enabled by the connecting regions 114 to 118, in particular about the bending axes 9 and 10.

For this purpose, in each of the connecting regions 124 to 129, adjacent ones of the bottom portions 144 to 149 are integrally connected to each other on the outside on each side with respect to the longitudinal extension 3 by means of a corrugation structure 111, wherein the corrugation structure 111 follows the corrugation shape of the corrugation structures 11. In a main extension surface of the bottom element 141 as seen between the two corrugation structures 111, the neighboring ones of the bottom portions 144 to 149 are additionally integrally connected by means of two further corrugation structures 111*a*, the waveform of each of which comprises a lower amplitude than the waveform of the corrugation structures 111, see for example FIGS. 6 and 8. The integrally formed bottom element 141 is thus easy to handle as a single component and allows simultaneous bending about the axes 9, 10.

Figure 3:
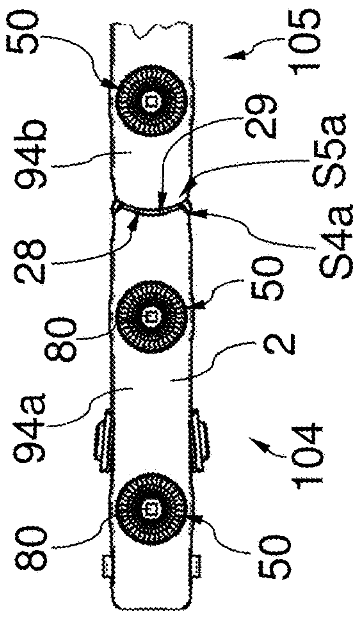
FIG. 3 a sectional and enlarged plan view of the lighting unit of FIG. 1.
Figure 11:
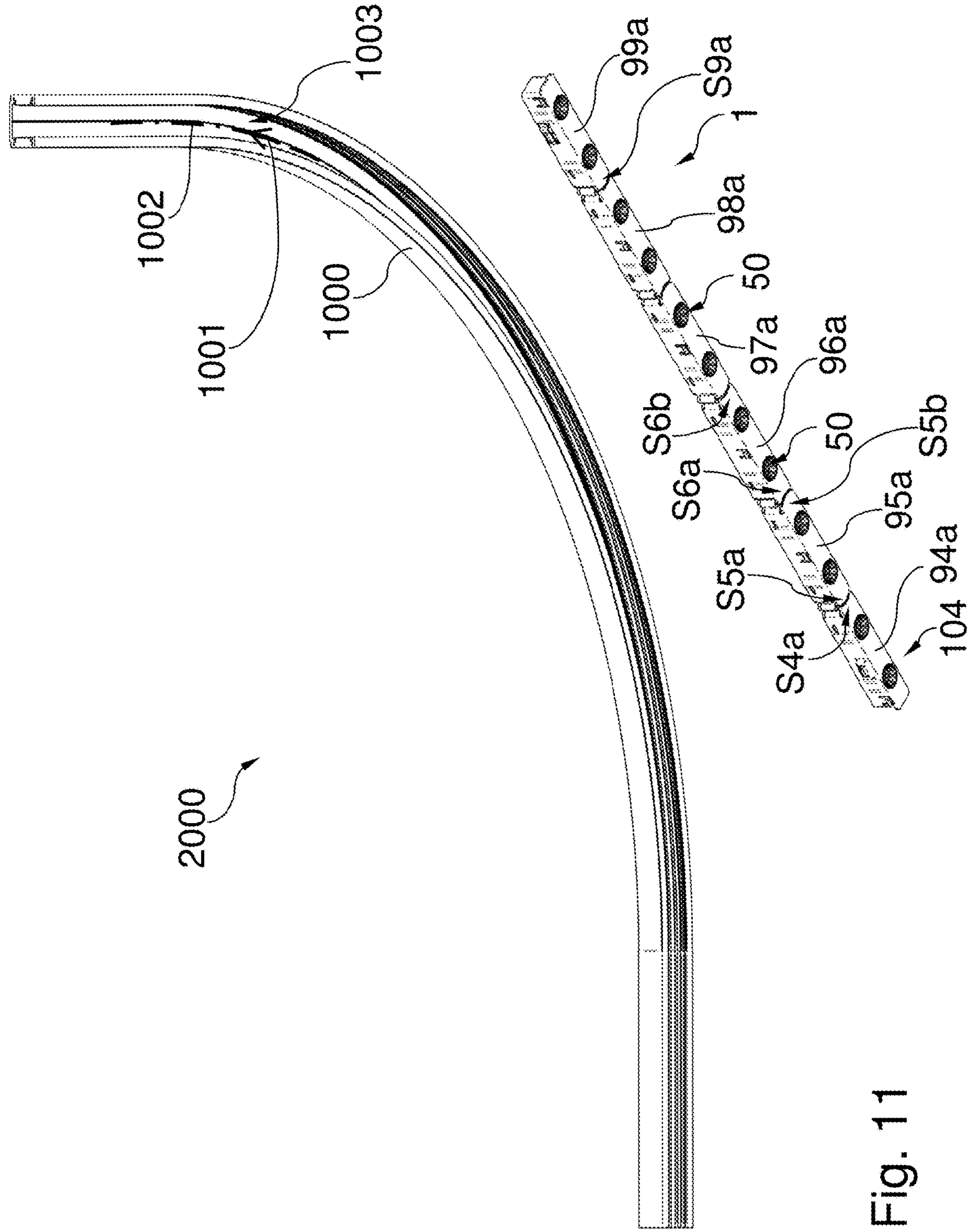
FIG. 11 a curved mounting track and a lighting unit according to the first exemplary embodiment for forming a lighting arrangement, before inserting the lighting unit into a mounting slot of the mounting track.

A gap is provided between facing narrow side edges of the adjacent lid portions 94*a* to 99*a*, for example between facing narrow side edges S4*a* and S5*a* of the lid portions 94*a* and 95*a* and between facing narrow side edges S5*b* and S6*a* of the lid portions 95*a* and 96*a*, in the unbent state of the lighting unit body 2 and thus of the lighting unit 1, see FIGS. 3 and 11. A corresponding gap is provided in the same way between the further narrow side edges facing each other of further of the lighting unit segments 104 to 109.

The narrow side edges S4*a* and S6*a* as well as the further exemplary narrow side edge S6*b* designated in FIG. 11 are each provided with a concave contour 29 as seen in a main extension plane of the lid portion 94*a*, 96*a*. The narrow side edges S5*a* and S5*b* as well as the further exemplarily designated narrow side edge S9*a* are each provided with a convex contour 28 as seen in a main extension plane of the lid portion 95*a* and 99*a*, respectively. Similarly, in the other lighting unit segments 104 to 109, one of the narrow side edges facing each other is formed with a convex contour and the other with a concave contour, see FIG. 11.

The convex contour 28 and the concave contour 29 mesh with each other in the connecting regions 114 to 118 in such a manner that the gap between the contours 28 and 29 remains in the unbent state. When the lighting unit 1 is bent, the lid portions 94*a* to 99*a* are thus prevented from colliding with each other, at least within a defined range of radii of curvature. At the same time, on the lower visible side of the lighting unit 1 in FIG. 11, on which the light is also emitted by the lighting unit 1 by means of the light generating apparatus 80 and the optical elements 52, the lid portions 94*a* to 99*a* connect to one another neatly and with small gaps between them.

Figure 12:
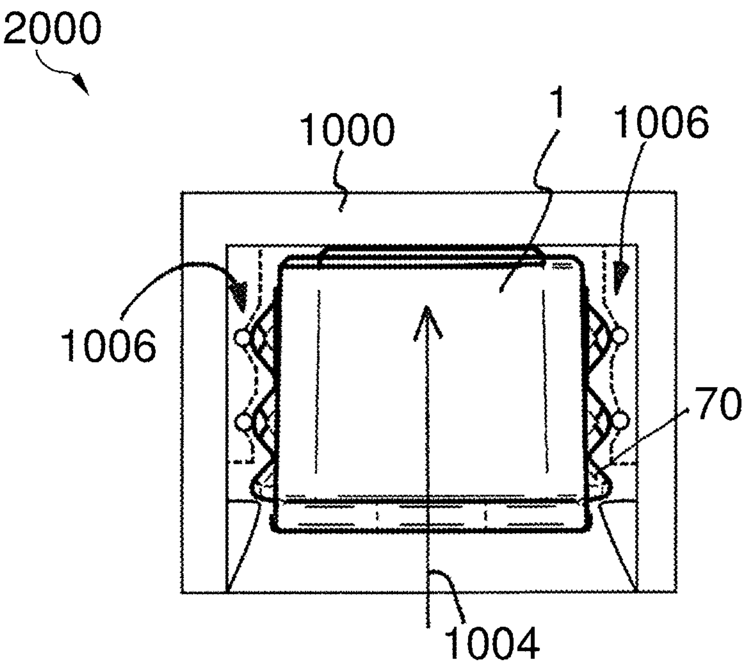
FIG. 12 a schematic cross-sectional view of the mounting track from FIG. 11 with the lighting unit inserted according to the first exemplary embodiment.

The lighting unit 1 is part of a track lighting system and is used to set up a lighting arrangement, for example to set up a lighting arrangement 2000 as shown in the exemplary illustration in FIGS. 11 and 12.

In the exemplary embodiment in FIGS. 11, 12, the track lighting system comprises at least one mounting track 1000, which follows a path 1001 with a longitudinal extension 1002 thereof. The path 1001 is hereby curved at least in sections. Along the longitudinal extension 1002, the mounting track 1000 comprises an elongated mounting slot 1003 with a depth direction 1004.

The lighting unit 1 can be inserted into the mounting slot 1003, thereby being mechanically coupled to the mounting track 1000 and contacting a conductor device 1006 arranged within the mounting slot 1003, see FIG. 12, by means of the contact elements 64 and 66. The conductor device 1006 is exemplarily provided in two parts on both sides of the inserted lighting unit 1 in the mounting slot 1003 and provides an electrical supply voltage, in particular low voltage, as well as a control signal, for example a DALI signal. Mechanically, the lighting unit 1 is held in a latching manner on the mounting track 1000 by means of latching elements 70, which are in particular integrally configured with the side walls 94*b* to 99*b*.

The exemplary lighting arrangement 2000 constructed on the basis of the track lighting system comprises the mounting track 1000 and the lighting unit 1 inserted into the mounting slot 1003 and making electrical contact with the conductor device 1006. The lighting arrangement 2000 may comprise further lighting units 1. The lighting unit 1 is used for generating light, which is directed and outputted in a directed manner by means of the optical elements 52. For this purpose, the lighting unit 1 is supplied with the electric power provided by the conductor device 1006 for operating the lighting unit 1 and with the control signal provided by the conductor device 1006 or controlled on the basis of the control signal.

The lighting unit 1 can be used in a flexible and versatile manner in mounting tracks 1000 that are bent in different ways, for example comprising different bending radii, wherein the bend along the path 1001 does not necessarily follow a circular shape, but may instead follow a different curve. The mounting track 1000 can also be curved in a plane or in space. Here, the mounting slot 1003 can open outwards at a wide variety of points in the cross-section of the curved mounting track 1000.

If the lighting unit 1 is only to be bent about the bending axis 9 in each of the connecting regions 114 to 118, the mounting track 1000 can, for example, follow a planar curve as a path 1001, wherein the depth direction 1004 is then oriented perpendicular to the plane in which the path 1001 lies. By means of relatively simply configured optical elements 52, a lighting arrangement 2000, which is formed for example as a luminous curve, can radiate towards the ground of a room in such a design.

Nevertheless, the lighting unit 1 of the first exemplary embodiment can be reliably used with mounting slots 1003, which are arranged in different ways on a mounting track 1000, wherein the mounting track 1000 can bend variously in a plane or in space, due to its bendability about the at least two bending axes 9 and 10, which run non-parallel and in particular transversely to the longitudinal extension 3.

For example, in one conceivable variant, if the path 1001 is a flat curve, the depth direction 1004 of the mounting slot 1003 can deviate from a normal to the plane of the curve, for example lie in the plane of the curve or be inclined at an angle thereto, at least in one mounting track portion 1000.

If, on the other hand, the path 1001 is a three-dimensional curve, the depth direction 1004 can deviate from a binormal of an accompanying tripod of the three-dimensional curve, for example run along a main normal or lie in the normal plane spanned by the binormal and the main normal, at least in one portion of the mounting track 1000. The lighting unit 1 can be used in the same way if the depth direction 1004 runs along the binormal or parallel thereto.

In the lighting arrangement 2000 shown in FIGS. 11, 12, the lighting unit 1 inserted into the mounting slot 1003 is bent about the first bending axis 9 after insertion due to the curvature of the path 1001. Only one portion of the curved mounting track 1000 is shown as an example. In lighting arrangements according to other conceivable embodiments, the curved mounting track 1000 or a portion thereof and thus the path 1001 may instead be curved in such a way that the inserted lighting unit 1 is bent in the connecting regions 114 to 118 about the second bending axis 10 or simultaneously about both the first bending axis 9 and the second bending axis 10.

FIGS. 13 to 14, 16 to 17 illustrate lighting arrangements 3000, 4000 and 5000 according to variants of a second exemplary embodiment. In the variant of the second exemplary embodiment in FIG. 14, a mounting track 1000 is used as described preceding with reference to FIGS. 11 and 12. In the lighting arrangements 4000 and 5000 according to variants of the second exemplary embodiment, which are shown in portions in FIGS. 14, 16 and 17, a modified mounting track 1000' is provided, which differs from the mounting track 1000 in that the mounting track 1000' comprises mounting slots 1003 and 1030 on opposite longitudinal sides thereof.

Figure 14:
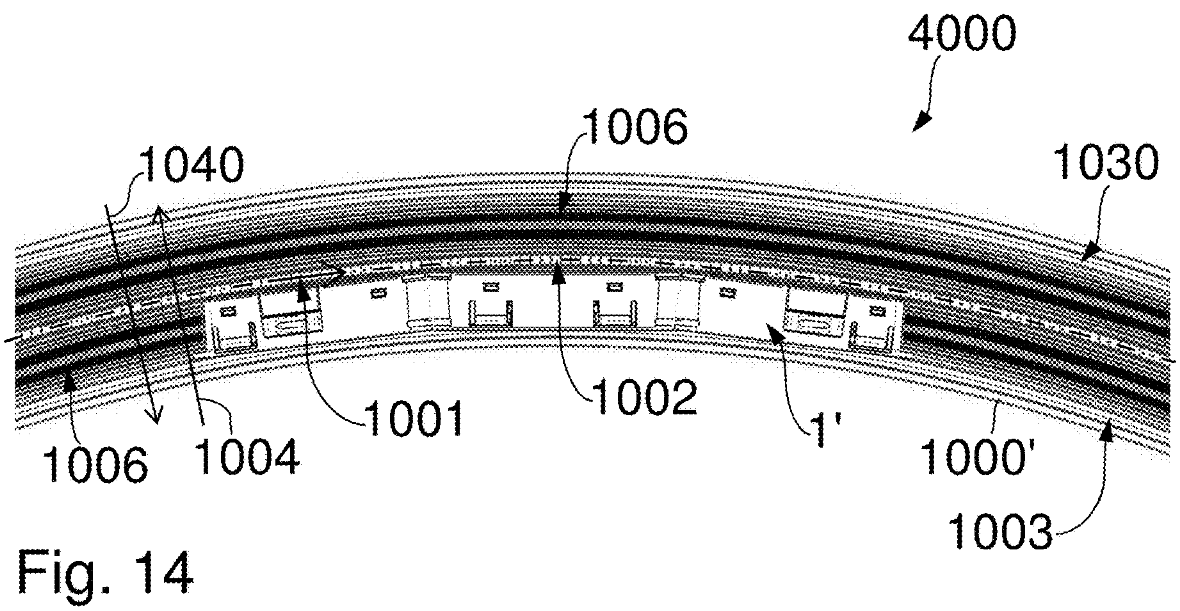
FIG. 14 a longitudinal center section of a mounting track in a portion of a lighting arrangement with the inserted lighting unit of FIG. 13, according to a variant of the second exemplary embodiment.
Figure 16:
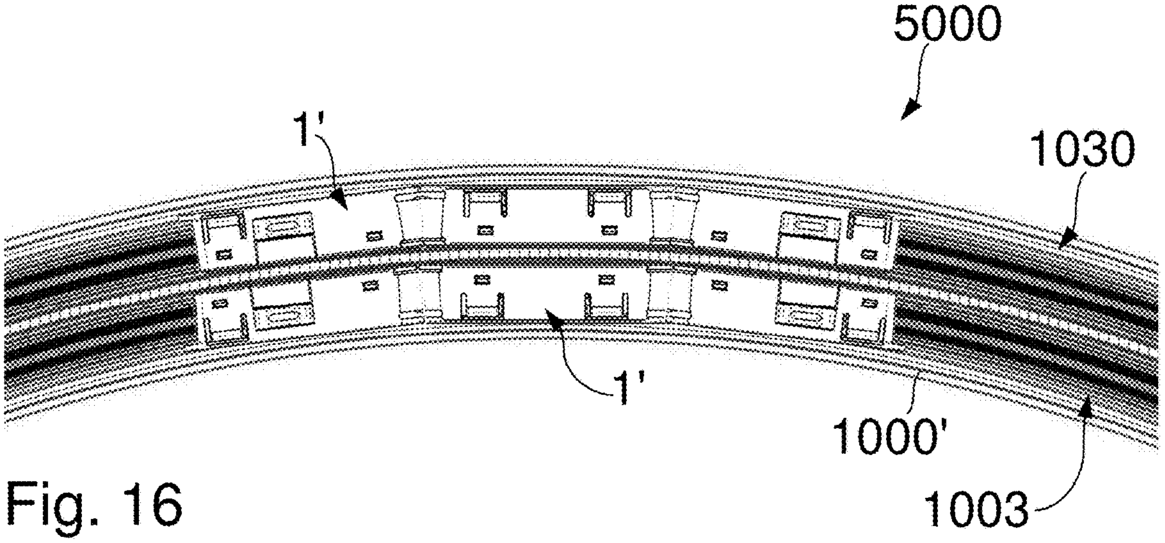
FIG. 16 a longitudinal center section of a mounting track in a portion of a lighting arrangement, with two lighting units inserted opposite to each other, wherein each of the lighting units is configured like the one shown in FIGS. 13 to 15, according to a still further variant of the second exemplary embodiment.
Figure 17:
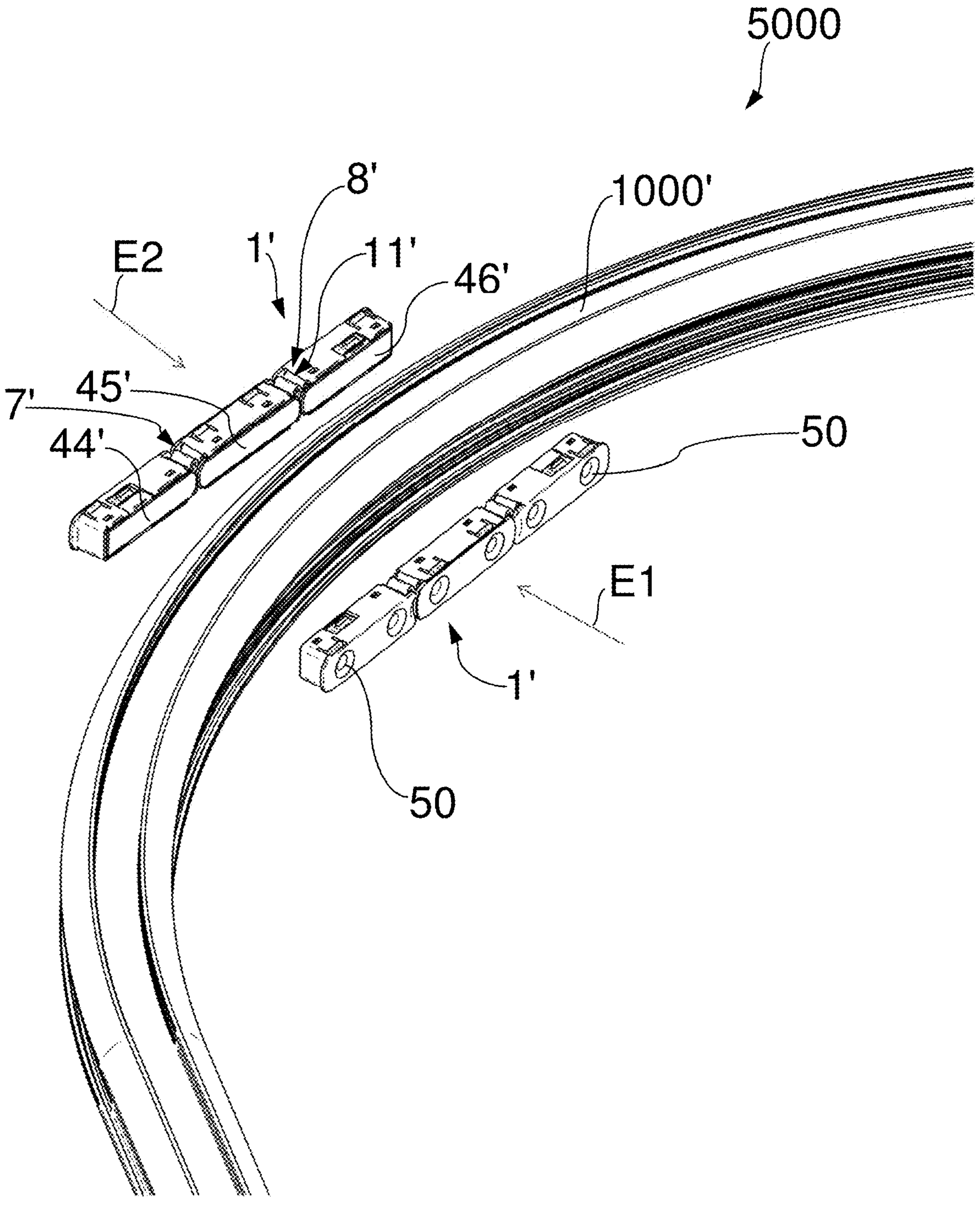
FIG. 17 a perspective view of a curved portion of the lighting arrangement of FIG. 16 during the insertion of the two lighting units.

The mounting track 1000' is thus provided with two mounting slots 1003, 1030, wherein in FIG. 14 only one of the mounting slots 1003, 1030, but in FIGS. 16, 17 a lighting unit 1' can be inserted into both of them. In particular, each of the two mounting slots 1003, 1030 is provided with a conductor device 1006, for example analogous to FIG. 12. FIG. 14 also shows a depth direction 1004 of the mounting slot 1003, which exemplarily opens from an inner radius of the curved portion of the mounting track 1000', and a depth direction 1040 of the mounting slot 1030, which exemplarily opens from an outer radius of the curved mounting track 1000'.

In the second exemplary embodiment and its variants, a lighting unit 1' is provided, the differences of which compared to the lighting unit 1, which was explained in detail preceding, are described below. Greater than this, the lighting unit 1' is configured like the lighting unit 1.

The lighting unit 1' comprises a lighting unit body 2, which is divided along a longitudinal extension of the lighting unit body 2 into three lighting unit segments 4, 5, 6, which are each connected in connecting regions 7' and 8' around the two bending axes 9, 10 in the same way as in the first exemplary embodiment. Like the connecting regions 114 to 118 of the lighting unit 1 described above, the connecting regions 7' and 8' are provided with corrugation structures 11' configured and arranged like the corrugation structures 11.

Figure 13:
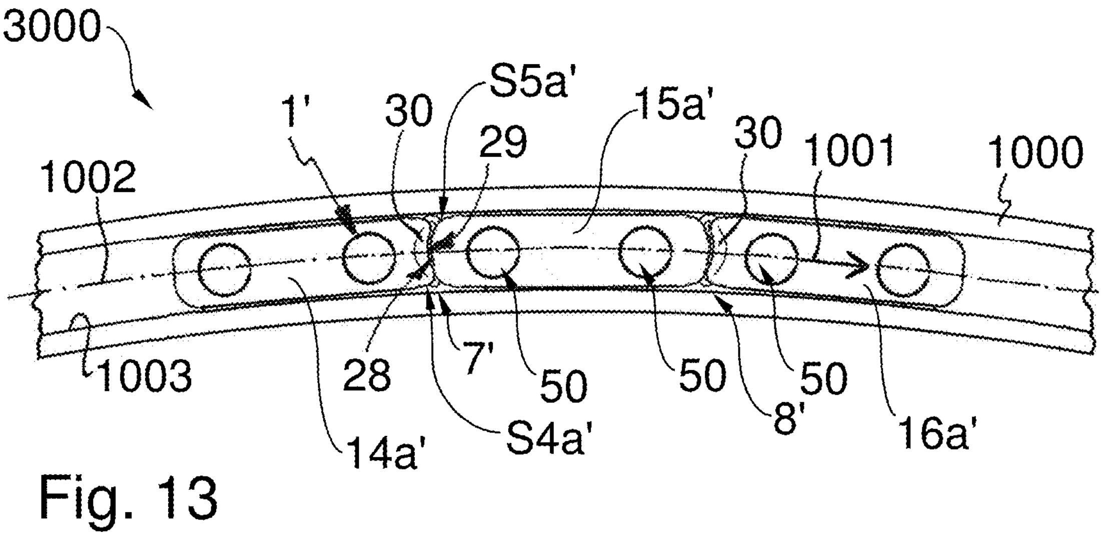
FIG. 13 a portion of a lighting arrangement according to a second exemplary embodiment, with a curved mounting track and a lighting unit inserted into a mounting slot of the same.

Narrow side edges of lid portions 14*a*', 15*a*' and 16*a*' of the lighting unit segments 4, 5, 6 facing each other are visible in FIG. 13. Of these, the narrow side edges S4*a*' and S5*a*' are labeled as examples in FIG. 13. The narrow side edge S4*a*' of the lighting unit segment 4 is configured with a concave contour 29, the narrow side edge S5*a*' of the lighting unit segment 5 with a convex contour 28, between which a gap remains, analogous to the first exemplary embodiment. However, the narrow side edges differ from those of the lid portions 94*a* to 99*a* in that a chamfer 30 is additionally configured in the thickness direction of the lid portion 14*a* in the area of the concave contour 29. The same applies to the narrow side edge of the lid portion 16*a*', see FIG. 13. In this way, bending about a bending axis 10, analogous to that shown in FIG. 1, can be further facilitated.

Furthermore, in the second exemplary embodiment, instead of a common bottom element for the lighting unit segments 4, 5, 6, separate bottom elements 44', 45' and 46' are provided, which close off the lighting unit segment 4, 5 or 6 on a side wall of the lid portion 14*a*', 15*a*' or 16*a*' and are latched to the side walls of these, for example. The narrow side edges of the bottom elements 44' and 45' as well as 45' and 46' facing each other, which are not described in more detail, are each configured with a convex contour, wherein a space remains between the bottom elements 44', 45' as well as 45', 46' in the unbent state of the lighting unit 1', see for example FIG. 17. In the lighting unit 1', the corrugation structures 111, 111*a* of the bottom element described above are thus not provided.

The bottom elements 44', 45', 46' are separate components made, for example, from a plastic material, in particular injection-molded or 3D-printed components. Also in the second exemplary embodiment, the lighting unit body 2 is configured with an integrally molded or 3D-printed component made of a plastic material, for example, and forms a component of a housing of the lighting unit 1' and comprises an elongated box-like shape.

FIG. 13 shows a lighting unit 1' inserted into the mounting slot 1003 of the mounting track 1000. The mounting track 1000 follows a path 1001 with its longitudinal extension 1002, which is configured as a flat curve. The depth direction 1004 is normal to the plane of this curve. Thus, the lighting unit 1' is substantially only bent about the first bending axis 9 in the connecting regions 7', 8'.

In the lighting arrangement 4000 in FIG. 14, on the other hand, the lighting unit 1' is inserted into the mounting slot 1003 of the mounting track 1000', which, however, is curved in a different way to that shown in FIG. 13. In order to follow the curvature of the path 1001 of the mounting track 1000', the lighting unit 1' is bent about the second bending axis 10 in each of the connecting regions 7', 8'. The lighting unit 1' bent in this way is shown separately in FIG. 15.

Figure 15:
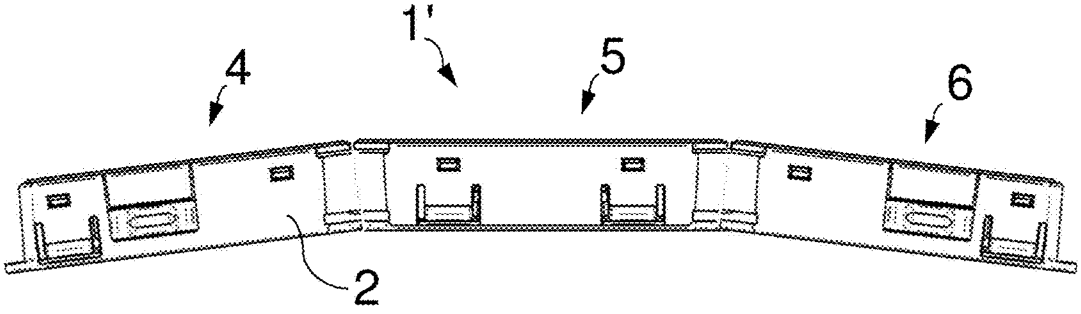
FIG. 15 a side view of the lighting unit of FIGS. 13, 14 in a curved state, as the lighting unit is used as an example in the lighting arrangement of FIG. 14.

Instead of the bending shown in FIGS. 14 to 15, the lighting unit 1' can also be bent in the other direction in the connecting regions 7', 8' around the bending axis 10 compared to FIGS. 14 to 15. FIG. 16 illustrates the lighting arrangement 5000, in which two lighting units 1' are arranged opposite each other in the curved mounting track 1000' portion. In this case, one of the lighting units 1' is inserted into the mounting slot 1003 and bent as in FIG. 13. The other lighting unit 1' is inserted into the mounting slot 1030 and is therefore bent around the second bending axis 10 in the connecting regions 7' and 8' in the opposite direction to the lighting unit 1' inserted into the mounting slot 1003.

The insertion of one of the lighting units 1' into the mounting slot 1003 along a first inserting direction E1, for example substantially parallel to the depth direction 1004 at the location of the center of the one lighting unit 1', and the insertion of the second of the lighting units 1' into the mounting slot 1030 along a second inserting direction E2, for example substantially parallel to the depth direction 1040 at the location of the center of the second lighting unit 1', is shown in perspective in FIG. 17. FIG. 17 shows the lighting units 1' still in their unbent state.

Figure 18:
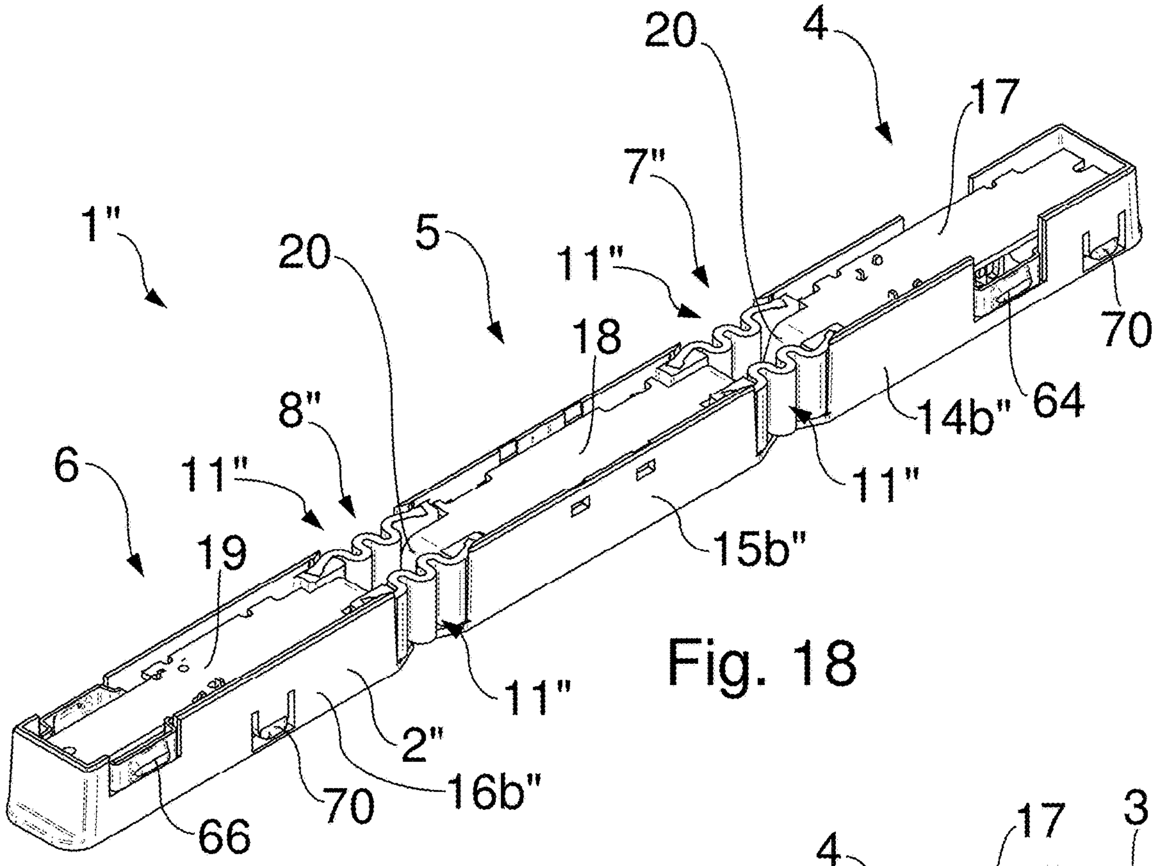
FIG. 18 a perspective view of a lighting unit according to a third exemplary embodiment, with one side open.

A lighting unit 1" according to a third exemplary embodiment is shown in FIG. 18. Lighting unit 1" is modified on the basis of lighting unit 1'. The differences are explained below in comparing lighting units 1 and 1', wherein the explanations above are also applicable to lighting unit 1". As described above for the first and second exemplary embodiments, the lighting unit 1" can be used as part of a track lighting system in a lighting arrangement, for example in a lighting arrangement such as the lighting arrangement 2000, 3000, 4000 or 5000.

The lighting unit 1" differs from the lighting unit 1 and 1' in that a lighting unit body 2" is provided in FIG. 18, which is formed with a first plastic material and a second plastic material, wherein the first and second plastic materials are different. In particular, the lighting unit body 2" is formed with an integrally injection-molded or 3D-printed component made with a single stroke from the first and second plastic materials. The second plastic material is more elastic than the first plastic material.

While the first plastic material, which is relatively rigid after solidification, is used in the area of the lighting unit segments 4, 5 and 6, the second plastic material, which is elastic and, for example, rubber-like after solidification, is used in the connecting regions 7" and 8" to form the corrugation structures 11". During the manufacturing, in particular by injection molding or 3D printing process, the corrugation structures 11" are integrally connected to the mutually adjacent side walls 14*b*", 15*b*" or 15*b*", 16*b*" of the lighting unit segments 4, 5 or 5, 6.

The more pliable, more flexible material of the corrugation structures 11" further improves the advantageous bendability of the lighting unit 1", in particular around the bending axes 9 and 10. For bottom elements not shown in FIG. 18 corresponding to the bottom elements 44', 45', 46' of the second exemplary embodiment, for example, the first, relatively rigid plastic material is also used in the lighting unit 1".

Figure 19:
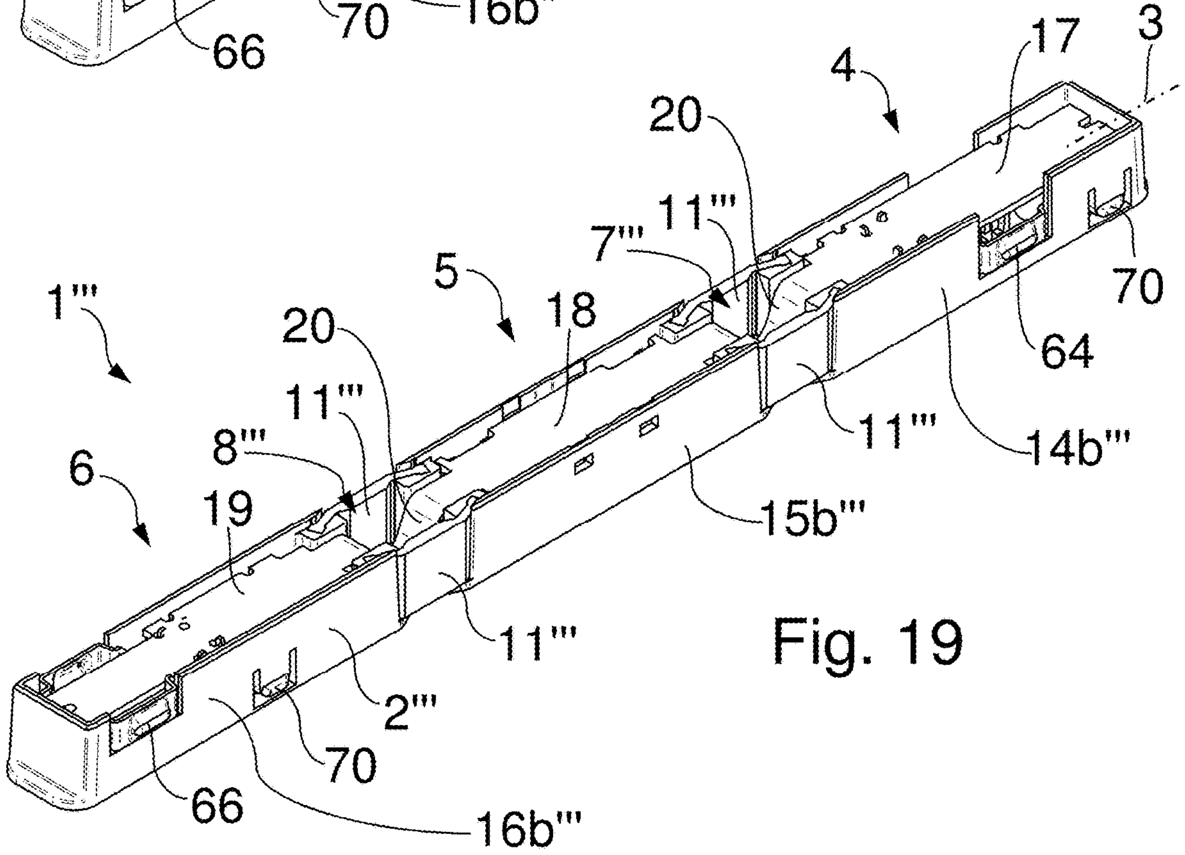
FIG. 19 a perspective view of a lighting unit according to a fourth exemplary embodiment, with one side open.

FIG. 19 shows a lighting unit 1'" according to a fourth exemplary embodiment, which in turn is modified compared to the first and second exemplary embodiments. The differences between the lighting unit 1'" and the lighting unit 1' are explained below in comparison, wherein reference is again made to the above explanations of the first and second exemplary embodiments. As described above, the lighting unit 1'" can be used as part of a track lighting system in a lighting arrangement, for example in the lighting arrangement 2000, 3000, 4000 or 5000.

The lighting unit 1'" comprises a lighting unit body 2'", which is divided into lighting unit segments 4, 5, 6 along the longitudinal extension 3. In the third embodiment example, the lighting unit segments 4, 5, 6 are connected in connecting regions 7'", 8'", wherein the connecting regions 7'", 8'" in turn enable bending about two respective non-parallel bending axes, which run non-parallel and in particular transversely to the longitudinal extension 3, in particular about the first and second bending axes 9, 10.

Analogous to the third embodiment example, the lighting unit body 2'" is formed with a first plastic material and a second plastic material, wherein the first and second plastic materials are different and wherein the second plastic material is more elastic than the first. The first plastic material is thus relatively rigid, whereas the second plastic material is configured to be elastic and, in particular, rubber-like. In the fourth embodiment example, two substantially flat, wall- or plate-like elastic intermediate portions 11'" are provided in each of the connecting regions 7'", 8'". The intermediate portions 11'" connect neighboring edge regions of the side walls 14*b*'", 15*b*'" and 15*b*"", 16*b*'" of the neighboring lighting unit segments 4, 5 and 5, 6 in substantially straight continuation of the main extension planes of the side walls 14*b*'", 15*b*'" and 15*b*"", 16*b*'". In this respect, see FIG. 19, the intermediate portions 11'" can be configured as substantially solid, elastic or rubber-like plate portions.

In the area of the lighting unit segments 4, 5 and 6 in the lighting unit body 2'" there is used the first plastic material, whereas for the purpose of forming the intermediate portions 11'" there is used the second plastic material, which is elastic and, for example, rubber-like after solidification. In particular, the lighting unit body 2'" is formed with an integrally injection-molded or 3D-printed component made with a single stroke from the first and second plastic materials. Bottom elements of the lighting unit 1'" are also preferably formed from the first plastic material, as in the third exemplary embodiment.

FIGS. 18 and 19 also show flat carrier components 17, 18 and 19, which are provided and connected analogously to the carrier components in the lighting units 1', 1", 1'" and carry electrical and/or electronic components as well as light generating apparatus, in particular LEDs. The lighting units 1', 1", 1'" also comprise optical elements in their interior, for example as in the first exemplary embodiment, which are not shown in FIG.

In the lighting arrangements 3000, 4000, 5000, the conductor device 1006 can also be contacted electrically by the contact elements 64, 66 of the lighting unit 1', 1', 1'" used in each case in order to tap a supply voltage and, in particular, also a control signal.

While in the exemplary embodiment shown in FIGS. 1-12 the lighting unit 1 comprises six lighting unit segments 104-109 and in the exemplary embodiments shown in FIGS. 13 to 19 the lighting unit 1', 1" or 1'" each comprises three lighting unit segments 4, 5, 6, it is understood that in further, modified exemplary embodiments fewer or more lighting unit segments, for example two, four, five, seven or eight, may be provided.

Although the present invention has been fully described above with reference to the preferred exemplary embodiments, it is not limited to these exemplary embodiments and can be modified in a variety of other ways.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Austrian application No. A50163/2024 filed Feb. 27, 2024, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

LIST OF REFERENCE SIGNS 1, 1', 1", 1'41 lighting unit
2, 2', 2", 2'" lighting unit body

3 longitudinal extension (lighting unit body)
104, 105, 106 lighting unit segment
107, 108, 109 lighting unit segment
4, 5, 6 lighting unit segment
114, 115, 116 connecting region
117, 118 connecting region
124, 125, 126 connecting region
127, 128 connecting region
7', 7", 7"' connecting region
8', 8", 8"' connecting region
9 first bending axis
10 second bending axis
11, 11', 11" corrugation structure
11"' elastic intermediate portion
12 corrugation peak
13 corrugation trough
111, 111*a* corrugation structure
94*a*, 95*a*, 96*a* lid portion
97*a*, 98*a*, 99*a* lid portion
94*b*, 95*b*, 96*b* side wall
97*b*, 98*b*, 99*b* side wall
94*c*, 95*c*, 96*c* interior
97*c*, 97*c*, 99*c* interior
94*d* opening
14*a*', 15*a*', 16*a*' lid portion
14*b*", 15*b*", 16*b*" side wall
14*b*"', 15*b*"', 16*b*"' side wall
134, 135, 136 flat carrier component
137, 138, 139 flat carrier component
17, 18, 19 flat carrier component
20 tape-like or film-like, flexible connection
22 bottom (U-shape)
23 transverse direction (lighting unit)
S4*a*, S5*a,b*, S6*a* narrow side edge
S9*a*, S4*a*', S5*a*' narrow side edge
28 convex contour
29 concave contour
30 chamfer
141 bottom element
144, 145, 146 floor portion
147, 148, 149 floor portion
44', 45', 46' bottom element
50 light emitting region
51 optical assembly
52 optical element
53 web
64, 66 contact elements
70 latching elements
80 light generating apparatus
1000, 1000' mounting track
1001 path
1002 longitudinal extension (mounting track)
1003 mounting slot
1030 mounting slot
1004 depth direction (mounting slot)
1040 depth direction (mounting slot)
1006 conductor device (mounting track)
2000, 3000 lighting arrangement
4000, 5000 lighting arrangement
E1, E2 inserting direction

What is claimed:

1. A lighting arrangement comprising:

a mounting track of a track lighting system, wherein the mounting track is shaped to follow a path curved at least in portions, is provided with at least one mounting slot along a longitudinal extension of the mounting track and comprises a conductor device; and at least one lighting unit of the track lighting system, which is inserted into the mounting slot for electrical contacting of the conductor device and is in electrical contact with the conductor device, wherein the lighting unit can be supplied at least with electric power provided by the conductor device for the operation of the lighting unit or at least with electric power provided by the conductor device and a control signal provided by the conductor device;

wherein the lighting unit comprises a lighting unit body which is divided into two or more lighting unit segments along a longitudinal extension of the lighting unit body, wherein in each case the mutually adjacent lighting unit segments are connected to each another in a connecting region, wherein the connecting region enables the lighting unit body to be flexibly bent about at least one bending axis in each case and in this respect the bending axis runs in each case non-parallel to the longitudinal extension of the lighting unit body, and wherein the lighting unit body is configured to be more flexible in the connecting region than in the region of the lighting unit segments in each case.

2. The lighting arrangement according to claim 1, wherein the at least one bending axis runs substantially perpendicular to the longitudinal extension of the lighting unit body.

3. The lighting arrangement according to claim 1, wherein the connecting region in each case enables the lighting unit body to be flexibly bent about at least two bending axes, and in this respect the two bending axes are non-parallel to each another and run non-parallel to the longitudinal extension of the lighting unit body.

4. The lighting arrangement unit according to claim 1, wherein the two bending axes are substantially perpendicular to each other and/or run substantially perpendicular to the longitudinal extension of the lighting unit body.

5. The lighting arrangement according to claim 1, wherein at least one of the lighting unit segments comprises at least one light generating apparatus.

6. The lighting arrangement according to claim 1, wherein the connecting region/connecting regions is/are configured with at least one corrugation structure with corrugation peaks and corrugation troughs in each case.

7. The lighting arrangement according to claim 1, wherein the connecting region/connecting regions is/are configured with at least one elastic intermediate portion in each case.

8. The lighting arrangement according to claim 1, wherein the lighting unit body is of box-like shape and that the lighting unit segments are each configured with at least one lid portion.

9. The lighting arrangement unit according to claim 8, wherein in each case in the connecting region, mutually adjacent edge regions of the side walls of the mutually adjacent lighting unit segments are connected by a corrugation structure with corrugation peaks (12) and corrugation troughs and/or in that in each case in the connecting region, mutually adjacent edge regions of the side walls of the mutually adjacent lighting unit segments are connected by a plate-like or wall-like elastic intermediate portion.

10. The lighting arrangement according to claim 9, wherein the crests of the corrugation peaks and bottoms of the corrugation troughs run substantially parallel to the side walls connected by the corrugation structure, or in that the plate-like or wall-like elastic intermediate portion is configured as a substantially planar continuation of a main extension surface of one of the side walls in the direction of an adjacent one of the side walls.

11. The lighting arrangement according to claim 8, wherein at least one flat carrier component is accommodated in the interiors of at least two mutually adjacent lighting unit segments in each case, wherein the flat carrier component carries electrical conductors, and in particular also electronic components and/or electrical contacting devices, and in that wherein the flat carrier components of the mutually adjacent lighting unit segments are connected to each other and electrically coupled by means of a ribbon-like or film-like, flexible connector.

12. The lighting arrangement unit according to claim 11, wherein one, several or all of the flat carrier components each carry/carries one or more light generating apparatuses configured as or with an LED or LEDs.

13. The lighting arrangement according to claim 11, wherein the flat carrier component is accommodated in the interior in each case substantially parallel to the lid portion between the side walls.

14. The lighting arrangement according to claim 11, wherein the tape-like or film-like, flexible connection is formed in the connecting region with a band-like or film-like, flexible material which carries conductive traces and is arranged bent in a U-shape in the connecting region.

15. The lighting arrangement according to claim 14, wherein the U-shape in a transverse direction of the lighting unit; is arranged between two of the corrugation structures (11; 11'; 11") of the connecting region or wherein the U-shape is arranged in a transverse direction of the lighting unit between two of the elastic intermediate portions of the connecting region.

16. The lighting arrangement according to claim 8, wherein in the interior there is further accommodated at least one optical element.

17. The lighting arrangement according to claim 8, wherein provision is made for a gap between mutually facing narrow side edges of the lid portions of the mutually adjacent lighting unit segments in an unbent state of the lighting unit body, wherein the narrow side edge of a first of the lid portions is formed with a convex contour, as viewed in a main extension plane of the first lid portion, and the narrow side edge of a second of the lid portions is formed with a concave contour, as viewed in a main extension plane of the second lid portion, and the convex and concave contours mesh with each other in such a way that the gap remains in the unbent state.

18. The lighting arrangement according to claim 1, wherein the lighting unit body is made of at least one plastic material.

19. The lighting arrangement according to claim 1, wherein the mutually adjacent lighting unit segments are integrally connected in the connecting region.

20. The lighting arrangement according to claim 1, wherein the lighting unit body is configured with the same plastic material, in the lighting unit segments and in the connecting regions.

21. The lighting arrangement according to claim 1, wherein in the lighting unit segments the lighting unit body is configured with a first plastic material, and in the connecting regions the lighting unit body is configured with a second plastic material, said second plastic material being different from the first plastic material.

22. The lighting arrangement according to claim 1, wherein the lighting unit body is manufactured in an injection moulding process or in a 3D printing process.

23. The lighting arrangement according to claim 1, wherein:

the path is a planar curve and that a depth direction of the mounting slot is substantially aligned normal to a plane of the curve, or wherein the path is a planar curve and at least in one portion of the mounting track a depth direction of the mounting slot deviates from a normal to the plane of the curve, or wherein the path is a three-dimensional curve and, at least in one portion of the mounting track, a depth direction of the mounting slot deviates from a binormal of an accompanying tripod of the three-dimensional curve.

24. The lighting arrangement according to claim 1, characterized in that the mounting track comprises at least two mounting slots and wherein the lighting arrangement comprises at least two lighting units, which are each inserted into one of the mounting slots at least in portions opposite one another within a portion of the mounting track within which the path is curved.

25. A track lighting system comprising a lighting unit and a mounting track which is shaped to follow a path curved at least in portions, the mounting track being provided with at least one mounting slot along a longitudinal extension of the mounting track, the mounting track comprising a conductor device;

wherein the lighting unit can be inserted into the mounting slot for electrical contacting of the conductor device;

wherein the lighting unit comprises a lighting unit body which is divided into two or more lighting unit segments along a longitudinal extension of the lighting unit body, wherein in each case the mutually adjacent lighting unit segments are connected to each another in a connecting region, wherein the connecting region enables the lighting unit body to be flexibly bent about at least one bending axis in each case and in this respect the bending axis runs in each case non-parallel to the longitudinal extension of the lighting unit body, and wherein the lighting unit body is configured to be more flexible in the connecting region than in the region of the lighting unit segments in each case; and wherein the lighting unit is configured to be supplied at least with electric power provided by the conductor device for the operation of the lighting unit or at least with electric power provided by the conductor device and a control signal provided by the conductor device.

* * * * *